Nov. 13, 1923.  1,474,235
J. H. BUTLER
BODY FOR FORD CHASSIS
Filed Dec. 24, 1920  2 Sheets-Sheet 1
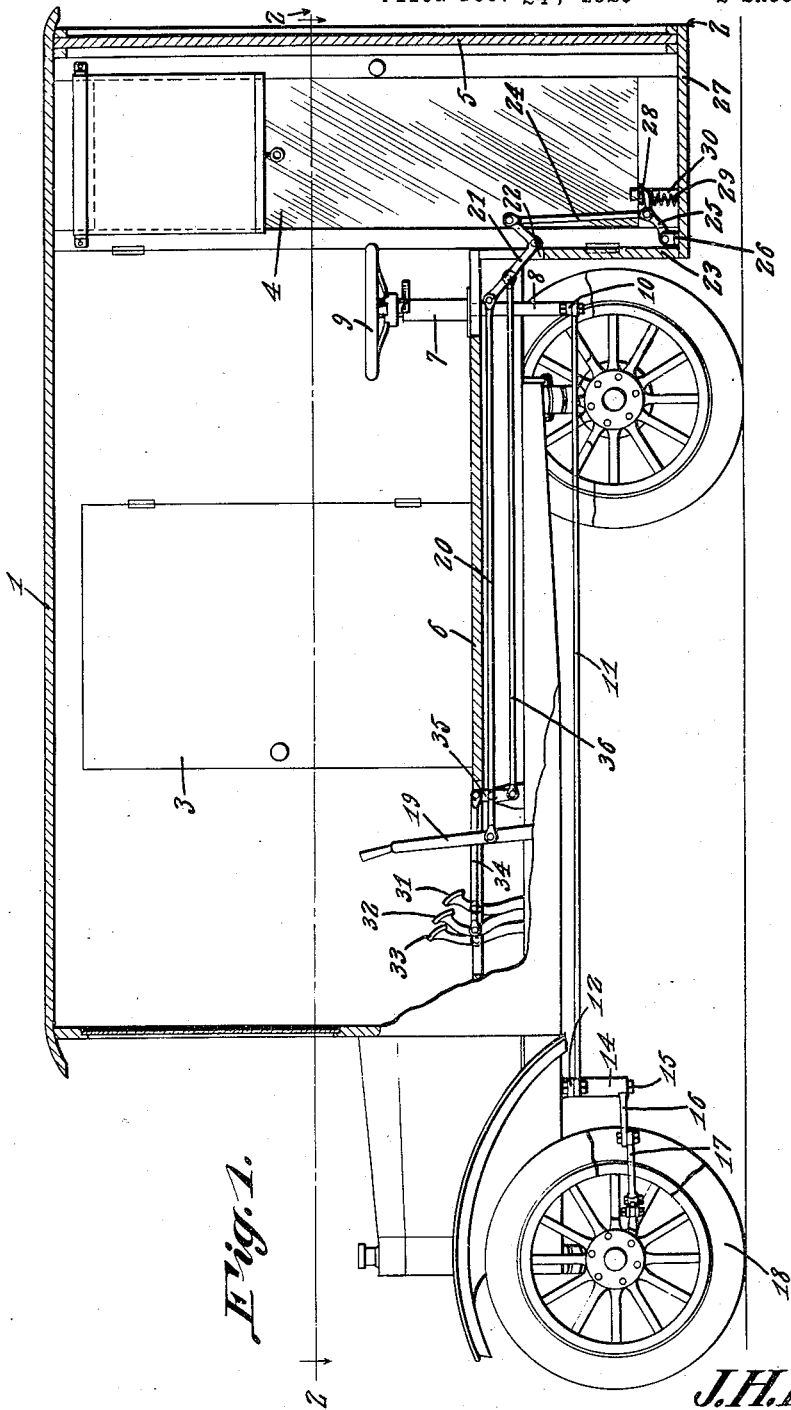
Inventor
J. H. Butler
By C. A. Snow & Co.
Attorneys Nov. 13, 1923.  1,474,235
J. H. BUTLER
BODY FOR FORD CHASSIS
Filed Dec. 24, 1920  2 Sheets-Sheet 2
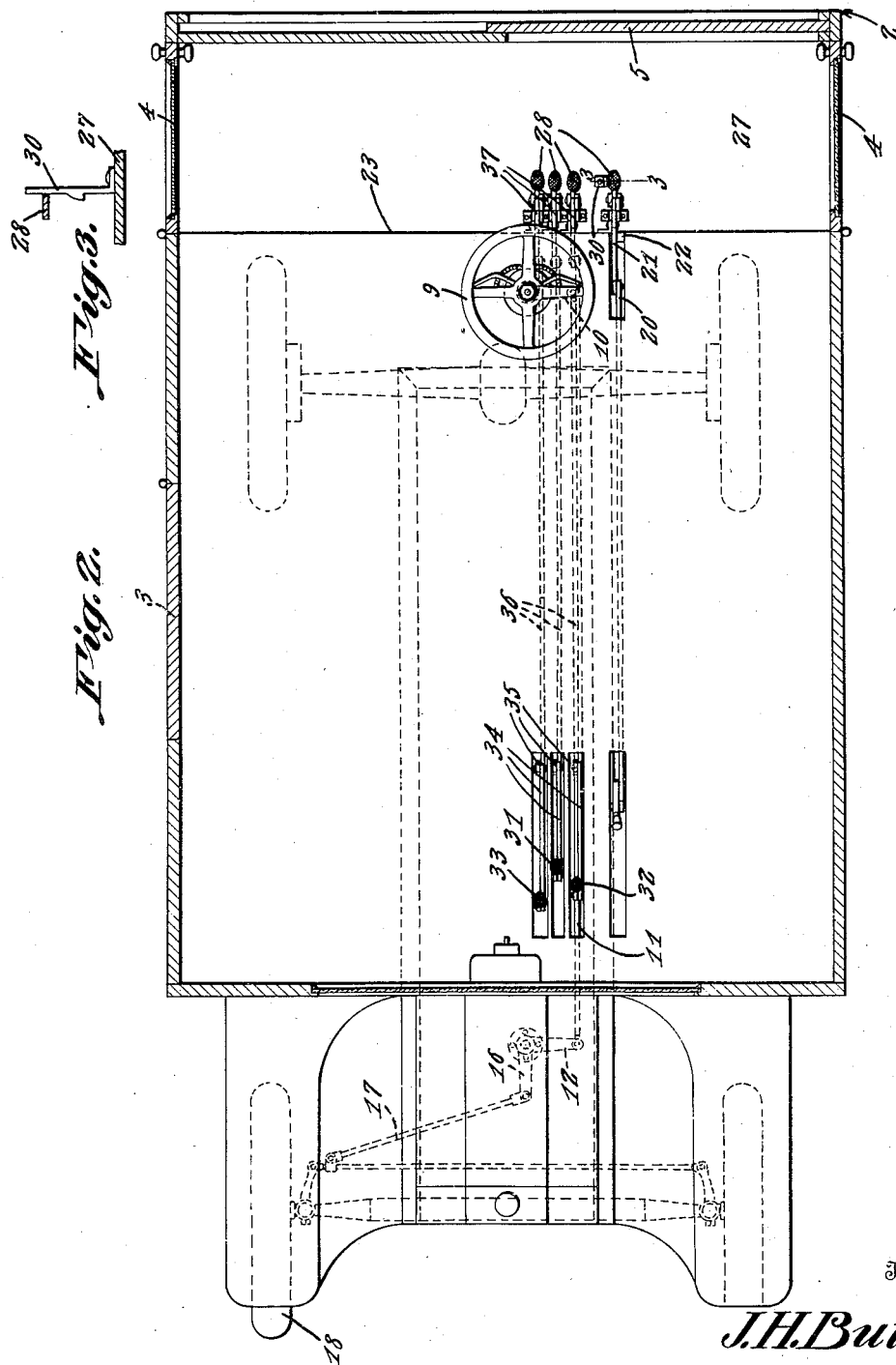
Inventor
J.H.Butler,
By C.A.Snow&Co.
Attorneys Patented Nov. 13, 1923.

1,474,235

UNITED STATES PATENT OFFICE.

JAY H. BUTLER, OF NEWARK, OHIO.

BODY FOR FORD CHASSIS.

Application filed December 24, 1920. Serial No. 432,914.

*To all whom it may concern:*

Be it known that I, JAY H. BUTLER, a citizen of the United States, residing at Newark, in the county of Licking and State of Ohio, have invented a new and useful Body for Ford Chassis, of which the following is a specification.

This invention aims to provide novel means whereby, through the instrumentality of a special body and auxiliary controling mechanism, a common Ford motor vehicle frame may be used to form a vehicle which is operated from the rear end, as distinguished from the forward end, the resulting structure being of peculiar utility as a delivery vehicle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in vertical longitudinal section, a device constructed in accordance with the invention, parts being in elevation; Figure 2 is a horizontal section on the line 2—2 of Figure 1; Figure 3 is a fragmental section taken on the line 3—3 of Figure 2.

In carrying out the invention, a body 1 is mounted on the usual Ford chassis. The body 1 is provided at its rear end with a depending cab 3. The body and the cab may be made of any desired materials. The body 1 is supplied with a side loading door 3, the cab 2 having side doors 4 and a rear sliding door 5, to the end that access may be had readily to the cab 2. The floor of the body 1 is denoted by the numeral 6.

A bearing 7 is mounted on the floor 6 of the body 1 closely adjacent to the cab 2. A shaft 8 is journaled in the bearing 7 and carries a steering wheel 9 accessible to a person occupying the cab 2. On the lower end of the shaft 8 there is a crank arm 10 connected by a link 11 with an arm 12 on a sleeve 14, the sleeve 14 being journaled on a spindle 15 depending from the frame work of the vehicle. The sleeve 14 has a crank arm 16 to which the drag link 17 is pivoted, the drag link being connected operatively with the front wheels 18, in the usual or in any desired way.

The emergency brake lever appears at 19. The forward end of a connecting rod 20 is pivoted to the lever 19, the rear end of the rod being pivoted to a bell crank lever 21 fulcrumed at 22 on the front wall 23 of the cab 2, the wall 23 having an opening through which one arm of the lever 21, and the corresponding arms of other levers hereinafter described, extend.

A link 24 connects the rear end of the bell crank lever 21 with a pedal or lever 25 fulcrumed on a bracket 26 carried by the bottom of the cab 2. The foot plate of the lever or pedal 25 is denoted by the numeral 28. A latch 30 is carried by the bottom 27 of the cab 2 and is adapted to cooperate with the foot plate 28 of the pedal 25. A compression spring 29 is interposed between the pedal 25 and the bottom 27 of the cab 2.

A person occupying the cab 2 can operate the pedal 25, motion being transmitted to the bell crank lever 21, through the link 24, the connecting rod 20 actuating the ordinary emergency brake lever 19.

Although the brake lever 19 has been shown as actuated by the pedal 25, it is to be understood that the lever 19 may be operated in any suitable way, from the cab 2, the member 21 constituting the lever for actuating the part 19.

A reverse pedal is shown at 31, the clutch pedal at 32 and the brake pedal at 33. To these pedals, links 34 are connected, each link 34 being pivoted at its rear end to the upper extremity of a rock arm 35 fulcrumed intermediate its ends on the vehicle frame. To the lower ends of the rock arms 35, the forward ends of connecting rods 36 are pivoted, the rear ends of the rods 36 being pivoted to bell crank levers 37 mounted like the bell crank lever 21, the pedals 38 being mounted like the pedal 25 and being connected to their respective bell crank levers 37 by links such as the part 24.

All of the pedals 38 are accessible to a person in the cab 2. The doors 4 and 5 give ready access to the cab 2, and from the cab, the merchandise in the body 1 can be reached without difficulty, the structure being of peculiar utility as a delivery vehicle.

It is to be observed that the body 1, including the cab 2, together with the operating mechanism, can be placed on an ordinary Ford chassis, without working any changes in the standard equipment.

Having thus described the invention, what is claimed is:

In a device of the class described, a motor propelled vehicle comprising front wheels and a frame, and provided adjacent to its forward end with an emergency brake lever, a reverse pedal, a clutch pedal and a service brake pedal; a body mounted on the frame and including a floor, the body being provided at its rear end with a depending cab comprising a bottom located at a level below that of the floor; other pedals mounted at the bottom of the cab, connections between said other pedals on the one hand and the brake lever and the first specified pedals on the other hand, the connections being extended upwardly in the cab and forwardly beneath the floor; an upright shaft supported for rotation in the body and provided with a steering wheel located above the floor in advance of the cab but accessible from the cab; and means for connecting said shaft with the front wheels.

In testimony that I claim the foregoing as my own, I have hereto affixed my signature in the presence of two witnesses.

JAY H. BUTLER.

Witnesses:
J. F. MYERS,
L. W. HOLTZ.